United States Patent [19]
Grant et al.

[11] Patent Number: 5,242,503
[45] Date of Patent: Sep. 7, 1993

[54] METHOD OF RESTORING CONTAMINATED SOLIDS USING ION EXCHANGE POWDER CONTACT

[75] Inventors: David C. Grant, Gibsonia, Pa.; Michael C. Skriba, Newport Beach, Calif.

[73] Assignee: Westinghouse Electric Corp., Pittsburgh, Pa.

[21] Appl. No.: 628,557

[22] Filed: Dec. 17, 1990

[51] Int. Cl.$^5$ .................................................. B08B 7/00
[52] U.S. Cl. ..................................... 134/25.1; 134/42; 210/688; 423/24
[58] Field of Search ................. 210/688; 134/42, 25.1; 423/24, DIG. 20

[56] References Cited
U.S. PATENT DOCUMENTS 4,783,263 11/1988 Trost et al. ........................ 210/638
4,808,318 2/1989 Komarneni et al. ................ 210/682

Primary Examiner—Theodore Morris
Assistant Examiner—Zeinab El-Arini
Attorney, Agent, or Firm—Daniel P. Cillo

[57] ABSTRACT

A process for removing metal from a solid material includes the steps of admixing the metal containing solid (10) with an aqueous liquid (26) and particles of ion exchange material (28) having a strong affinity for metal in a mixer (24), to form a slurry, allowing the slurry materials to interact, and removing the ion exchange material loaded with metal (32) from the solid.

9 Claims, 1 Drawing Sheet

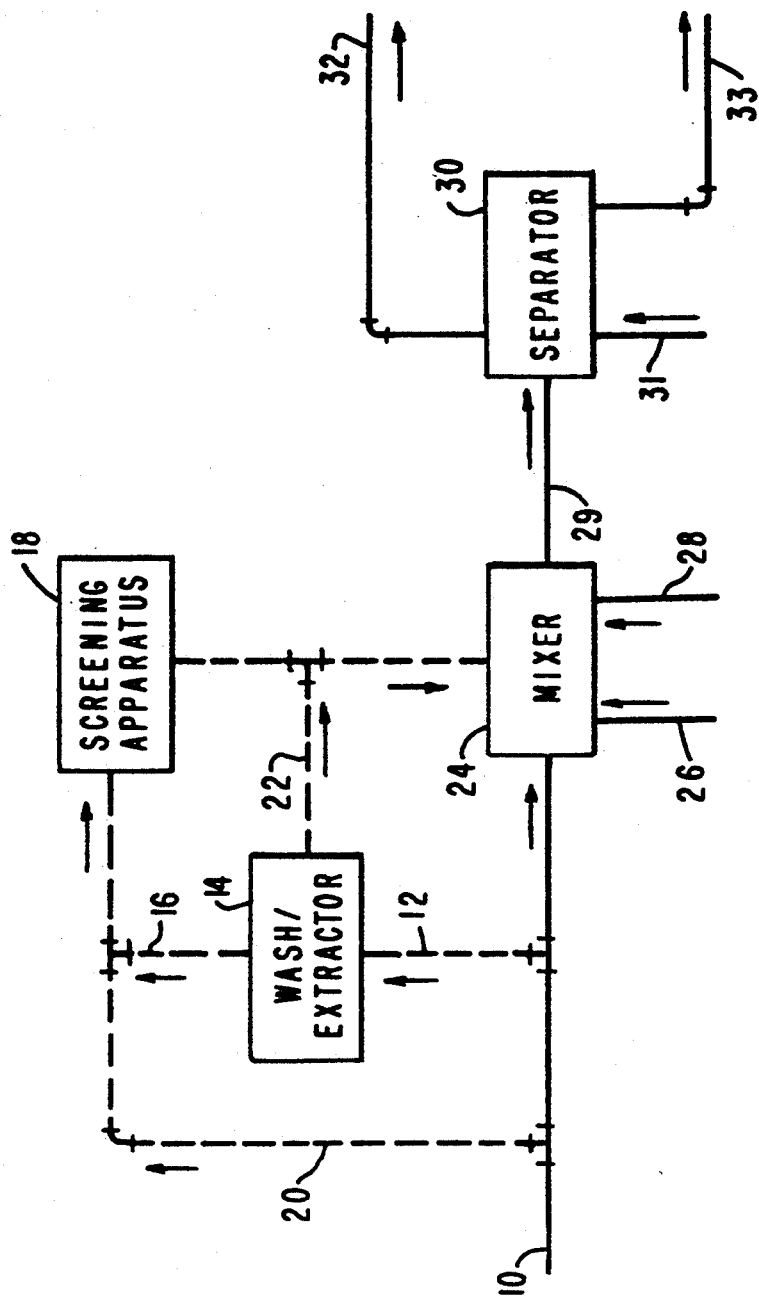

METHOD OF RESTORING CONTAMINATED SOLIDS USING ION EXCHANGE POWDER CONTACT

BACKGROUND OF THE INVENTION

This invention relates to a new aqueous slurry process which will effectively remove heavy metals from solids. The process involves mixing solid ion exchange material with contaminated solids in an aqueous liquid. Due to the high ionic activity of the ion exchange material, the contaminant will have a strong affinity for that material, and will thus move from the contaminated solid to the solid ion exchange material, with minimal contaminant concentration in solution.

The contamination of soils, sludges, ashes, and other solids by heavy metals or radioactive species is a significant environmental problem. Typically, large volumes are involved, and disposal costs for these solids are becoming extremely expensive. There is thus tremendous incentive to reduce the volume of waste requiring disposal. It has been found that a certain fraction of the contaminants present in solids is readily mobilized. Unfortunately, in many cases the amount of contaminant removed is not sufficient to reach the low residual environmental levels required by such groups as the Environmental Protection Agency, Nuclear Regulatory Commission, and various state regulatory agencies. The remaining fraction of contaminants is typically adsorbed or otherwise bound onto the solids, making removal difficult.

In many instances, the contaminant on the material, is extracted or dissolved in acid or base to produce a solution containing the metal. The contaminated solution is then separated from the material and further treated. The contaminant can then be removed from the solution. In the process of U.S. Pat. No. 4,808,318 (Komarneni et al.), hydrated sodium phlogopite mica, selective as to Cs, is used to remove Cs from a chloride solution. There, powdered phlogopite mica ion exchange material is mixed with CsCl solution for 4 days. The Cs is absorbed by the mica and fixed in the mica structure, not subject to displacement. The loaded ion exchange material is hen removed by a centrifuge. Passing the solution through a packed bed or column of the ion exchange mica is also taught.

In another attempt to remove contaminants, U.S. Pat. No. 4,783,263 (Trost et al.) teaches a process involving collecting contaminated soils, sludges, sediments, clays or the like, converting it into a slurry, and then adding surfactants, such as alphaolefin sulfonate, to desorb the contaminating metal or the like and place it in the liquid phase of the slurry, which liquid is concentrated as to the contaminant in a series of flotation cells and then disposed of. Neither of these processes is completely effective.

What is needed is an inexpensive process to dramatically lower contaminants such as Cu, Pb, Ce, Cd, U and the like, in an aqueous process which starts with contaminated soil. It is the main object of this invention to provide such a process.

SUMMARY OF THE INVENTION

Accordingly, the invention resides in a process for removing metal contaminants from solid material characterized by the steps of: (1) providing a metal contaminated solid material; (2) admixing the metal contaminated solid material with an aqueous liquid and powder particles of ion exchange material in a mixer to form a slurry containing homogeneously dispersed ion exchange particles, where the ion exchange material has a strong affinity for the metal contaminants and where the ion exchange material is selected from the group consisting of low density organic resins and fine particulate inorganic material; (3) allowing the slurry materials to react so that metal contaminants transfer to the ion exchange material; and (4) separating the metal containing ion exchange material from the decontaminated solid material. In step (3), only trace amounts of the metal contaminants concentration are in solution.

Preferably, the ion exchange material particles will be selected from a low density resin, or a zeolite or clay having particle sizes smaller than the bottom range of particle sizes of contaminated solid material. Use of either of these two types of ion exchange material will allow ease of separation of the loaded ion exchange material and the purified solid material. Preferably, the ion exchange material is mixed with the aqueous liquid before contact with the contaminated solids. Preferably, the metal loading of the ion exchange material will be so high that the loaded ion exchange material can be used as feedstock to a metal recovery process, such as a smelting operation.

BRIEF DESCRIPTION OF THE DRAWING

In order that the invention can be more clearly understood, convenient embodiments thereof will now be described, by way of example, with reference to the accompanying drawing, which is a block diagram flow chart of the method of this invention.

DESCRIPTION OF THE PREFERRED EMBODIMENTS

Referring now to the drawing, metal contaminated solid material stream 10, which has been grossly prescreened to remove large rocks or the like having diameters over approximately 5 cm, is fed into a mixer 24, where it is admixed with a liquid component and ion exchange material, to provide a slurry dispersion of contaminated solid and solid ion exchange material in liquid. This solid material steam 10 will usually be soil which contains environmentally contaminating metals, such as Cu, Pb, Zn, Cd, Ba, Ag, Ce, Cs, Sr, Co, Cr, Hg, Th, Rb, U, and their mixtures. The liquid component can be added the same time as the solid components or mixed with the ion exchange material first.

The solid material stream 10 can, in some instances, initially be fed by means of stream 12 to be contacted with a liquid effective to rinse the solid material, or extract part of the contaminating metal from the solid material, in wash/extractor 14. The extraction liquid, when used, would be a low concentration, up to 1 Molar, carbonate, hydroxide or other suitable extractant, for example ammonium carbonate. The extraction liquid could also be a low concentration, up to 1 Molar, acid, for example hydrochloric acid or sulfuric acid. Water might also be effective as a general rinse. For example, carbonate/bicarbonate could be used to extract U, Th, or Cs; hydroxide could be used to extract Pb, Cs, or Sr; acetic acid could be used to extract Ag, Pb, Ba, Cd, Zn, Cu, Cs, Sr, Co, Hg, or Pb; hydrochloric acid could be used to extract Cr, Th, Sr, Pb, Ba, Cd, Zn, Cu, Rb, Co, Hg, or Pb; and sulfuric acid could be used to extract Cd, Cs, Hg, Rb, Ag, U, Th, or Zn.

The contaminated material of stream 10 could be screened to remove lumps or rocks over 1 cm diameter and fines below 125 micrometers in a screening apparatus 18, either as a first step by means of stream 20 or after initial wash/extraction by means of stream 16. Wash/extracted, contaminated material could also bypass the screening apparatus 18 by means of stream 22. The screening apparatus can be of any suitable type, for example, a standard filter to remove the larger fraction and a hydrocyclone to remove the finer solid fraction in the overflow. Preferably, the contaminated material will be screened or cycloned to remove fines below 50 micrometers, and so could have a particle size range of from 50 micrometers to 1 cm upon entering mixer 24.

In the mixer 24, the aqueous liquid, which is added by stream 26, can be a base solution such as sodium hydroxide or potassium hydroxide if metals such as Pb or Cs are present, or an acid solution such as hydrochloric acid if metals such as Cu, Ba, Cd or Sr are present, or water or aqueous sodium acetate, potassium acetate, or ammonium acetate in all instances. Aqueous sodium acetate is particularly useful with Ag, and aqueous ammonium bicarbonate or sulfuric acid are particularly useful with U. Organic solvents are avoided to eliminate hazards associated with them, for example, environmental unacceptability, fire/explosion potential, and toxicity. The preferred weight ratio of contaminated solid material:liquid in the mixer can range from a ratio of 1:1 (50% solids) to a ratio of 1:20 (5% solids), preferably from 1:1 to a ratio of 1:10. Under 5% solids, excessive extractant would be required leading to excessively large processing equipment, and solid to solid contaminant transfer would suffer. Over 50% solids, the process would be mechanically difficult to operate.

In the mixer 24, the ion exchange material, fed into the mixer through stream 28, could be a low density solid resin having particle sizes from approximately 150 micrometers to 2,000 micrometers, or a solid zeolite or clay having particle sizes below 125 micrometers and preferably below 50 micrometers. The preferred weight ratio of contaminated solid material:solid ion exchange material in the mixer can range from a ratio of 500:1 to a ratio of 2:1 and is most preferably from a ratio of 300:1 to a ratio of 5:1. Over a 500:1 ratio, ion exchange material might not contact contaminant. Less than a 2:1 ratio is not likely to be economical or lead to a significant reduction of contaminant.

The preferred ion exchange material is a resin having particle sizes from 150 micrometers to 2,000 micrometers and a density of up to 1.5 g/cm$^3$. Useful resinous materials effective to attract metal cations generally have structures such as a strong acid sulfonated, polystyrene divinyl benzene; weak acid carboxylic acrylics; strong base quaternary ammonium gels; or a weak base polystyrene-polyamine. In addition, a chelating functionality group may be incorporated into the resin to produce a greater affinity for the metals. Particle sizes less than 150 micrometers will cause difficulty in separation from the soil. Densities greater than 1.5 g/cm$^3$, again, will be difficult to separate from the soil.

Other ion exchange materials useful to attract metals include zeolites, such as analcime ($Na_2O \cdot Al_2O_3 \cdot 4SiO_2 \cdot 2H_2O$) particularly useful for Ag; chabazite ($CaAl_2Si_4O_{12} \cdot 6H_2O$) particularly useful for Pb, Rb and Cs; clinoptilolite ($Na_2O \cdot Al_2O_3 \cdot 10SiO_2 \cdot 8H_2O$) which is particularly useful for Ba and Sr; erionite ($[Ca, Mg,- Na_2, K_2]O \cdot Al_2O_3 \cdot 6SiO_2 \cdot 6H_2O$) which is particularly useful for Cs; mordenite which is particularly useful for Cu; phillipsite ($[Ca, K_2] Al_2Si_4O_{12} \cdot 4 H_2O$) which is particularly useful for Cs and Ba; and a variety of processed, commercially available zeolites. The zeolite materials are usually hydrated minerals or synthetic materials having a continuous framework of linked tetrahedral grouping around silicon or aluminum. Clay ($Al_2O_3Si-O_2 \cdot XH_2O$) is also a useful ion exchange material for all of the metal cations. In all cases, the ion exchange material used will have a strong affinity for the contaminant metal, allowing, in this system, minimal contaminant concentration in the liquid phase.

After admixing in the mixer 24, an aqueous slurry is formed of aqueous liquid, and homogeneously dispersed contaminated solids and solid ion exchange material, the latter being selected to preferentially attract the metal contaminant sought to be eliminated. Due to the high ionic activity of the solid ion exchange material selected, the contaminant metal will be immediately attracted to the solid ion exchange material. The contaminant concentration in solution is thus maintained at essentially zero, that is, trace amounts, from approximately 0.1 ppm to approximately 5 ppm, providing a continual driving force for the movement of the contaminant from the contaminated solid onto the solid ion exchange material.

The quick movement of the contaminant as it is continually removed by the ion exchange material in this process results in extremely high contaminant removal. Aggressive, high concentrated extractants, which are costly and corrosive are thus avoided with this process. This process can be a batch process using, for example, mixed tanks, or as a continuous process using, for example, an attrition scrubber flow through mixer. Once loaded, the powdered ion exchange material can be readily separated from the decontaminated solids by a variety of particle size separation techniques for example fluidization or floatation. This process is capable of producing very low contaminant levels in the solids, while generating a concentrated waste stream.

As shown in the drawing, after a required period of reaction contact time in the mixer 24 of from approximately 30 seconds to 1 hour, where the residence time will be that required to load the ion exchange resin, stream 29 will be discharged to the ion exchange material separator 30, such as a fluidized column separator. Water stream 31 can be injected to flow up through the slurry. The ion exchange material from stream 28, whether it be zeolites and clays of less than 125 micrometer diameter or low density resins in the 150 micrometer to 2,000 micrometer range will flow to the top of column and be removed as overflow at top exit 32. Clean solid material exists by stream 33. If a cyclone separator is used as separator 30, no stream 31 will be necessary, the ion exchange material will discharge out the top, and the clean soil will be discharged as stream 33. Thus, separation of metal containing ion exchange material utilizes density or size differences. Lower density or smaller size ion exchange material are fluidized or centrifuged from the higher density or larger solids, or small size ion exchange materials are screened from the larger size solids.

If the ion exchange material is highly loaded, it may be advantageous to smelt the material to recover the metal. In some instances, the loaded ion exchange material can be chemically treated with highly concentrated salts, such as NaCl, or acids, such as HCl to release concentrated metal component and allow reuse of the resin.

The invention will now be illustrated with reference to the following examples:

EXAMPLE 1

Two samples of soil, one containing 1,280 ppm (parts per million) Cu(Sample A), and the other containing 1,230 ppm Cu(Sample B), were grossly filtered to remove rocks over 2.54 cm diameter, washed with water, and then filtered to remove particles below 44 micrometers. In both instances, the washed, copper contaminated waste was above an environmentally acceptable level. The waste was then added to a water-zeolite mixture and further mixed to produce a homogeneous slurry.

The weight ratio of waste:water was 1:5 and the weight ratio of waste:zeolite was 4:1. After 15 minutes the loaded zeolite, was removed by fluidization, and the waste soil dried. The soil was analyzed at four steps. The results are shown in Table 1 below:

TABLE 1

Restoration of Copper Contaminated Soil

| Sample | Treatment | WET Method** Cu, ppm |
|---|---|---|
| A | 1. None | 1,280 |
| | 2. Water Wash | 611 |
| | 3. Water Wash & Fines Removal | 81 |
| | 4. Water Wash, Fines Removal, & Zeolite* Contact In An Aqueous Slurry | 29.3 |
| B | 1. None | 1,230 |
| | 2. Water Wash | 213 |
| | 3. Water Wash & Fines Removal | 50.5 |
| | 4. Water Wash, Fines Removal, & Zeolite* Contact In An Aqueous Slurry | 17.5 |

*Zeolite used was supplied under the trade name Linde A-51 having a size of 1 to 10 micrometers.
**California Waste Extraction Test.

As can be seen, direct powdered zeolite contact in treatment 4 of both Samples provided a dramatic decrease in Cu concentration from washed, coarse soil which had Cu tightly bound to it. Also, the loaded zeolite was easily removed from the bulk of the soil.

EXAMPLE 2

One portion (Sample C) of a soil sample containing 200 ppm U was washed with 0.2 Molar aqueous ammonium bicarbonate solution, but U was still present over the 42 ppm minimum standard set by U.S. Government regulations. A second portion (Sample D) was homogeneously mixed with 0.2 Molar aqueous ammonium bicarbonate solution and an ion exchange resin of the strong base quaternary ammonium gel type, having a particle size between 420 micrometers and 1,200 micrometers, and a density of approximately 1.1 g/cm$^3$, which is uranium specific (sold by Dow Chemical Company under the Tradename "Dowex 21K"). A slurry of the second portion mixture contained a weight ratio of waste:liquid of 1:1 and a weight ratio of waste:ion exchange resin of 200:1. After reaction contact for 1 minute the loaded resin was removed from the slurry by fluidization, and the waste soil was dried and analyzed. The results are shown in Table 2 below:

TABLE 2

Restoration of Uranium Contaminated Soil

| Sample | Treatment | Soil U, ppm |
|---|---|---|
| C | None | 200 |
| | Aqueous Ammonium Bicarbonate Wash | 106 |
| D | None | 200 |
| | Ion Exchange Resin Contact In Aqueous Ammonium Bicarbonate Slurry | 25 |

As can be seen, dramatically improved results were attained using the ion exchange resin. Higher levels of ion exchange resin in the slurry would have reduced the uranium level further. In the ammonium bicarbonate solution of Sample D, there was less than 2 ppm uranium ion present, showing that the contaminant concentration in solution was maintained at trace amounts.

We claim:

1. A process for removing metal contaminants from solid material comprising the steps:
   (a) providing a metal contaminated solid material;
   (b) admixing the metal contaminated solid material with an aqueous liquid and solid powder particles of ion exchange materials, to form a slurry containing homogeneously dispersed solid ion exchange particles and metal contaminated solid material, where the ion exchange material has a strong affinity for the metal contaminants, the ion exchange material is selected from the group consisting of low density organic resins and fine particulate inorganic material, and where the weight ratio of metal contaminated solid material:liquid is from a ratio of 1:1 to a ratio of 1:20, and the weight ratio of metal contaminated solid material:solid ion exchange particles is from a ratio of 500:1 to a ratio of 2:1;
   (c) allowing the slurry materials to react, so that metal contaminants transfer from contaminated solid to the solid ion exchange material, where contaminant concentration in solution in the aqueous liquid is only a trace amount; and
   (d) separating the metal containing ion exchange material from the decontaminated solid material.

2. The method of claim 1, where the metal contaminated material is screened to have particle sizes greater than 50 micrometers before step (b), and where the amounts of metal contaminants concentration in solution in step (c) are below 5 ppm, which concentration provides a continual diving force for the movement of metal to the solid ion exchange material.

3. The method of claim 1, where the metal contaminants are selected from the group consisting of Cu, Pb, Zn, Cd, Ba, Ag, Ce, Cs, Sr, Co, Cr, Hg, Th, Rb, U, and mixtures thereof.

4. The method of claim 1, where the ion exchange material is a resin, having a density up to 1.5 g/cm$^3$ and a particle size range of from 150 micrometers to 2,000 micrometers, and the contaminated solid material has a particle size from 125 micrometers to 1 cm, where separation in step (d) utilizes density or size differences.

5. The method of claim 1, where the ion exchange material is an inorganic material selected from the group of zeolite and clay, having a particle size up to 125 micrometers, and the contaminated solid material has a particle size from 125 micrometers to 1 cm, where separation in step (d) utilizes density or size differences.

6. The method of claim 1, where, after step (d) the metal containing ion exchange material is smelted to recover the metal.

7. The method of claim 1, where the weight ratio of metal contaminated solid material:solid ion exchange material in the mixer is from a ratio of 300:1 to a ratio of 5:1, and the ratio of metal contaminated solid material:liquid in the mixer is from a ratio of 1:1 to a ratio of 1:10.

8. The method of claim 1, where aqueous liquid and the ion exchange material are mixed first in step (b) and where the contaminant concentration in solution is maintained at essentially zero in step (c).

9. The method of claim 1, where the separation of step (d) utilizes density or size differences between the materials.

* * * * *